Aug. 30, 1955   W. H. NONEMAKER ET AL   2,716,391
PAINT SPRAY MASK FOR AUTOMOBILE WHEELS
Filed Jan. 8 1954

INVENTOR.
WILBUR H. NONEMAKER
BY CARROLL S. FRITZ

ATTORNEY

United States Patent Office 2,716,391
Patented Aug. 30, 1955

2,716,391

PAINT SPRAY MASK FOR AUTOMOBILE WHEELS

Wilbur H. Nonemaker, East Prospect, and Carroll S. Fritz, York, Pa.

Application January 8, 1954, Serial No. 402,892

6 Claims. (Cl. 118—505)

This invention relates to a mask for automobile wheels and particularly a mask used in painting an automobile wheel, the purpose of the mask being to shield at least a major portion of the tire, and particularly that portion nearest the rim of the wheel, while painting an assembled tire and automobile wheel. Most automobile painting, at the present time, is performed by spray means. In order to prevent the sprayed paint from contacting the tire of a wheel and tire assembly, it is necessary to cover or mask the tire in some manner and especially the side wall of the tire adjacent the rim of the wheel. Heretofore, it has been customary to consume considerable time in applying masking tape to the tire or to attach by tape, or otherwise, masking paper affixed to the tire so that the sprayed paint would not contact the tire. Such procedure is extremely time consuming and thus adds materially to the cost of painting automobile wheels.

Previous attempts have been made to devise masks of various kinds for applying more expeditiously shielding or masking means to a tire when it was desired to paint the wheel by spray means. The few masks which have been devised have been complicated and expensive. Hence, their use has not been widely accepted by painters engaged in automobile painting.

It is the object of the present invention to provide a simple and inexpensive mask which may be quickly and effectively attached to an assembled tire and automobile wheel, the mask being of such size that it shields at least the larger portion of the side wall of a tire casing adjacent the rim of the wheel to be painted. Effective means which operate simply are provided to attach the mask quickly to the rim of such automobile wheel. Similarly, the mask may quickly be removed from a painted wheel and applied to another wheel. The invention also includes manipulating means to facilitate the attachment and detachment of the mask to a wheel and tire assembly. Further, the edge of the mask which is disposed within the crevice-like groove or slight space between a tire rim and wheel rim is suitably shaped to provide a secure attachment of the mask to the wheel and tire assembly.

Details of the objects of the invention and of the structure thereof, as well as other objects of the invention, are set forth in the following specification and illustrated in the accompanying drawings comprising a part thereof.

Figure 1:
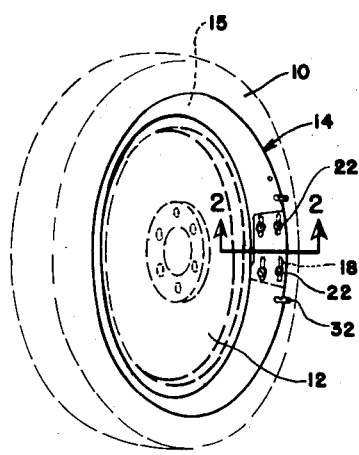
Fig. 1 is a perspective view of an assembled automobile wheel and tire, illustrated in phantom, and showing a painting mask embodying the invention applied thereto as it appears in use.

Referring to the drawings, and particularly Fig. 1, a tire 10 is shown attached to a disc-type wheel 12, these being illustrated in broken lines, phantom-wise. The mask 14 which comprises the present invention is constructed preferably from some flat sheet-like metal, such as sheet metal, fiber, plastic, or any other suitable material which is relatively stiff, yet flexible. It has been found from practice that sheet-like material having a thickness of approximately .025" is adequate for the desired purposes and affords suitable shape-retention and stiffness.

While said mask may be formed from any of the materials mentioned above, sheet steel has been found to be very suitable and relatively inexpensive. It also has been found that a band approximately three inches wide is adequate to afford sufficient protection to the tire 10 while painting the wheel 12 by spray means. However, this dimension is not intended to be restrictive since the width of the band may vary and still afford the benefits of the invention.

Figure 2:
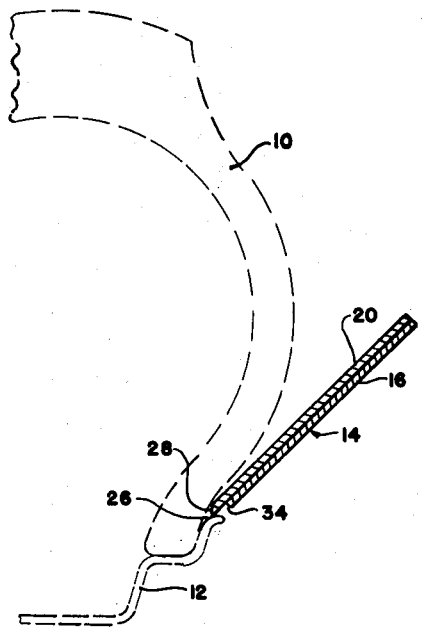
Fig. 2 is a fragmentary sectional view, on a larger scale than used in Fig. 1, showing a transverse section of the tire and wheel assembly with the mask applied in use, this view being taken on the line 2—2 of Fig. 1.
Figures 3, 4:
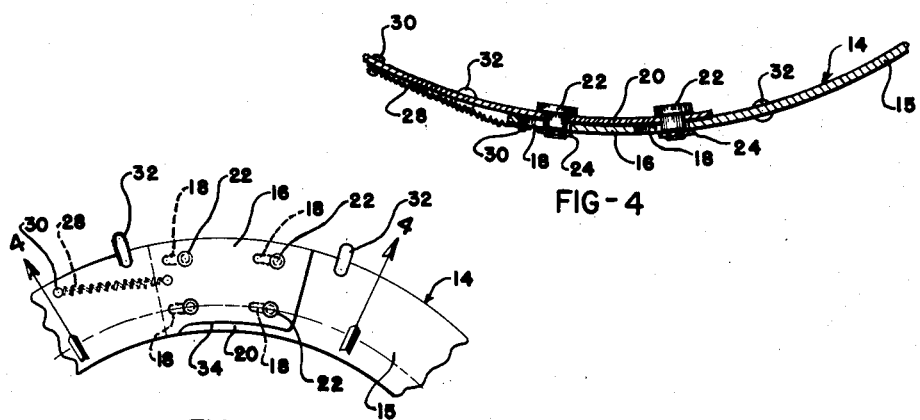
Fig. 3 is a fragmentary side view of a portion of the painting mask illustrated in Figs. 1 and 2, but shown on a smaller scale than Fig. 2, the portion of the mask illustrated in this figure being that which includes the overlapping end portions of the band comprising the mask.
Fig. 4 is a sectional view of the structure shown in Fig. 3 taken substantially on the line 4—4 of Fig. 3.

In forming the mask 14, an arcuate band 15 is cut from a stock sheet of metal, the length of the band being such as to form a circular frustro-conical configuration when the ends of the band are overlapped as shown in Figs. 1, 3 and 4. The frustro-conical shape illustrated best in Fig. 1, and the slope of the band is illustrated to best advantage in Fig. 2. It will be noted that the conical angle is quite wide to dispose the band 15 as closely as possible to the side wall of the tire commensurate with the reception of the inner rim of the mask within the groove 26. While it is preferred to have the band formed in one piece, it also is within the purview of the invention that said band may be formed from plural sections of material which are joined together to provide the required length.

One end portion of the band 15 is provided with a plurality of slots 18 which preferably are substantially parallel. The other end portion 20 of the band has a plurality of headed pins 22 fixed extending therethrough. These pins may be similar to rivets and the ends thereof which project through the slots 18 preferably have washers 24 secured thereto, the diameter of the washers being such as to overlap the sides of the slots 18. The pins 22 and slots 18 afford limited relative longitudinal movement of the end portions 16 and 20 of said band so as to permit expansion and contraction of the mask for purposes of attaching it to and detaching it from the groove 26 between the rim of the tire 10 and the outer rim of the wheel 12 as illustrated in Fig. 2. However, said pins and washers prevent complete separation of said end portions of band 15. Further to facilitate the reception of the inner edge of the rim of the mask 14 within the groove 26, said inner edge of band 15 preferably is provided with a bevel 28 as shown in Fig. 2.

To effect attachment of the mask to the wheel, the mask automatically is contracted to effect the reception of the inner edge of the mask within the groove 26. Any suitable elastic means, such as a spring 28, is utilized for this purpose. One end of said spring is secured, for example, by a rivet 30 to the end portion 20, and the opposite end of said spring is secured by another rivet 30 to the opposite end portion 16, as clearly shown in Figs. 3 and 4.

In the most preferred construction of the invention, manually engageable means such as fingers 32 are attached to the opposite end portions 16 and 20 of the band 15, in order that said ends of the band may be moved relatively for purposes of expanding the mask as when attaching it to a wheel and tire assembly or when detaching the same therefrom. It is to be understood however that the fingers 32 are merely exemplary and other types of manually engageable means, such as buttons or ears may be used. To facilitate manipulation of said ends of the mask, the manually engageable means 32 preferably are mounted on the band adjacent the outer edge thereof where they will not interfere with the inner or wheel engaging edge of the mask. Also, they are least likely to be coated with paint in this position.

In use, the mask 14 is aligned substantially concentrically with the rim of the wheel 12 and the manually engageable means 32 are operated respectively by a painter to spread said overlapping ends longitudinally or, in other words, expand the diameter of the mask. The inner edge of the mask 14 then is disposed within the groove 26. The stiffness of the mask 14 insures easy disposition of the inner edge thereof within said groove. When said inner edge has been disposed within the groove 26, the means 32 are released to permit the spring 28 to contract the mask and thereby secure the mask to the wheel assembly. Slots 18 are of sufficient length to permit the mask to be contracted readily so as to firmly dispose the inner edge of the mask within the groove 26.

In order that the overlapping ends 16 and 20 of the mask will not present undue thickness for purposes of reception within the groove 26, one of said end portions is provided with a relieved or cut-a-way edge portion 34, as clearly shown in Figs. 2 and 3. The mask thus can be mounted securely upon the wheel and tire assembly in operative position. The wheel then may be painted by spray means or otherwise without risk of the tire 10 receiving any of the paint. Conventional paints used today on vehicles and particularly those used in spray guns are quick-drying and thus within a very short time after a wheel has been painted, the mask 14 may be removed and is ready for use on another wheel.

It will be noted that the spring 28 or other contracting means is disposed adjacent the surface of the mask which is nearest the side wall of the tire 10 so as to prevent said spring from becoming coated with paint each time the mask is used.

After a wheel has been painted and it is desired to remove the mask from the wheel and tire assembly, the means 32 are grasped by the painter and moved in opposite directions away from each other to expand the mask and permit its quick detachment from the tire and wheel assembly.

Modern vehicles of different makes usually have wheels which are of uniform diameter. This diameter may vary between different makes of vehicles but, unless said diameter varies substantially, a mask or set of masks embodying the present invention may be attached to different diameters of wheels within a restricted range by providing slots 18 of adequate length to permit effective attachment. However, if the diameter of the wheels vary appreciably, a set of masks of various circumferential lengths to accommodate certain ranges of diameters may be provided in accordance with the present invention so as to render said masks of the present invention adaptable to a relatively wide range of diameters of wheels. Inasmuch as the simplicity of the construction and the manufacturing costs of masks embodying the present invention is relatively small compared to certain complex masks now in use, providing a set of masks for different diameters of wheel, as described above, will enable a vehicle painting establishment to paint a wide range of different diameter wheels without undue cost.

While the invention has been shown and illustrated in its preferred embodiment, and has included certain details, it should be understood that the invention is not to be limited to the precise details herein illustrated and described since the same may be carried out in other ways falling within the scope of the invention as claimed.

We claim:

1. A mask detachably mountable on an automobile tire and wheel assembly to shield the tire while painting the wheel and comprising a shield of flexible substantially flat sheet-like material formed into a frustro-conical band having overlapping ends and the angle of the frustro-conical formation being relatively wide in order to render the band capable of being positioned close to the sidewall of a tire when the mask is in operative position, said band being sufficiently wide to shield an appreciable portion of the wheel outward and the inner edge of said band being bevelled for disposal circumferentially around said wheel between the rim thereof and tire to secure the shield detachably to said tire and wheel assembly, and spring means connected to the ends of said band and operable relative to the overlapping ends of said band to contract said band and dispose the inner edge thereof in firm engagement with the rim of said wheel.

2. The mask recited in claim 1 further characterized by said spring being attached to the surface of the band which is adjacent the tire in use, whereby said band shields said spring from contact by paint.

3. The mask recited in claim 1 further including aligning mechanism comprising pin means attached to a portion of one end of said band and slot means in a portion of the other end of said band which slidably receive said pin means.

4. The mask recited in claim 3 further characterized by said pins being headed and operable to prevent separation of said ends of said band in a direction perpendicular to the planes of said ends.

5. A mask detachably mountable on an automobile tire and wheel assembly to shield the tire while painting the wheel and comprising a shield of flexible substantially flat sheet-like material formed into a frustro-conical band having overlapping end portions and the angle of the frustro-conical formation being relatively wide in order to render the band capable of being positioned close to the sidewall of a tire when the mask is in operative position, said band being sufficiently wide to shield an appreciable portion of the tire from the wheel outward and the inner edge of said band being bevelled for disposal circumferentially around said wheel between the rim thereof and tire to secure the shield detachably to said tire and wheel assembly, means connected between the end portions of said band and operable to contract said band to dispose the inner edge thereof into firm engagement between said wheel rim and tire and thereby secure the shield automatically to said assembly, and manually engageable means attached to said end portions of said band adjacent the outer edge thereof and projecting therefrom in spaced relationship to each other to facilitate expanding said band incident to positioning the same on said wheel and removing it therefrom.

6. A mask detachably mountable on an automobile tire and wheel assembly to shield the tire while painting the wheel and comprising a shield of flexible substantially sheet-like material formed into a frustro-conical band having overlapping end portions and the angle of the frustro-conical formation being relatively wide in order to render the band capable of being positioned close to the sidewall of a tire when the mask is in operative position, the inner edge of one of said end portions being cut-a-way to provide at the inner edge of said overlapping portion of said band substantially only a single thickness of material, said band being sufficiently wide to shield an appreciable portion of the tire from the wheel outward and the inner edge of said band being disposable circumferentially around said wheel between the rim thereof and tire to secure the shield detachably to said tire and wheel assembly, and spring means connected between the ends of said band and operable to contract said band to dispose the inner edge thereof into firm engagement between said wheel rim and tire and thereby secure the shield automatically to said assembly.

References Cited in the file of this patent

UNITED STATES PATENTS

| 2,081,666 | Gunn | May 25, 1937 |
| 2,634,704 | Morrison | Apr. 14, 1953 |